US00RE34229E

United States Patent [19]

Shimizu et al.

[11] E Patent Number: Re. 34,229

[45] Reissued Date of Patent: Apr. 20, 1993

[54] CYLINDRICAL PERMANENT MAGNET AND METHOD OF MANUFACTURING

[75] Inventors: Motoharu Shimizu, Kumayaga; Noriyuki Noda; Yoshihiro Noguchi, both of Fukaya, all of Japan

[73] Assignee: Hitachi Metals, Ltd., Japan

[21] Appl. No.: 426,569

[22] Filed: Oct. 6, 1989

Related U.S. Patent Documents

Reissue of:

[64] Patent No.: 4,547,758
Issued: Oct. 15, 1985
Appl. No.: 446,322
Filed: Dec. 2, 1982

[51] Int. Cl.[5] ..... H01F 7/02

[52] U.S. Cl. ..... 335/302; 264/DIG. 58; 310/156

[58] Field of Search ..... 335/284, 302, 303; 252/62.63; 264/DIG. 58; 310/156

[56] References Cited

U.S. PATENT DOCUMENTS

| | | | |
|---|---|---|---|
| 3,114,715 | 12/1963 | Brockman et al. | 252/62.5 |
| 4,057,606 | 11/1977 | Kobayashi et al. | 264/24 |

FOREIGN PATENT DOCUMENTS

| | | | |
|---|---|---|---|
| 50-56594 | 5/1975 | Japan . | |
| 56-74907 | 6/1981 | Japan | 264/DIG. 58 |
| 57-37803 | 3/1982 | Japan | 264/DIG. 58 |
| 57-128909 | 8/1982 | Japan | 264/DIG. 58 |
| 57-130407 | 8/1982 | Japan | 264/DIG. 58 |
| 130407 | 12/1982 | Japan | 335/303 |

*Primary Examiner*—George Harris
*Attorney, Agent, or Firm*—Finnegan, Henderson, Farabow, Garrett & Dunner

[57] ABSTRACT

A cylindrical permanent magnet suitable for use as the rotor magnet of a stepping motor. The magnet is a sintered cylindrical permanent magnet having a composition expressed by $MO.nFe_2O_3$, where M represents Ba, Sr, Pb or mixture thereof, while n represents a value of 5 to 6. The sintered cylindrical permanent magnet is provided on its surface with multipolar anisotropy of more than 8 (eight) magnetic poles. Disclosed also is a method of producing the cylindrical permanent magnet.

5 Claims, 1 Drawing Sheet

CYLINDRICAL PERMANENT MAGNET AND METHOD OF MANUFACTURING

Matter enclosed in heavy brackets [ ] appears in the original patent but forms no part of this reissue specification; matter printed in italics indicates the additions made by reissue.

BACKGROUND OF THE INVENTION

The present invention broadly relates to a magnet suitable for use as the rotor magnet of a stepping motor and, more particularly, to a cylindrical permanent magnet having a surface multipolar anisotropy.

In order to effect a multipolar magnetization on the surface of a permanent magnet, it is essential that the permanent magnet has a high coercive force and that the reversible magnetic permeability is around 1. To meet these demands, hitherto, ferrite magnets such as barium ferrite magnet, strontium ferrite magnet and so forth have been used as the permanent magnet for multipolar magnetization. Materials of such permanent magnets are stoichiometrically expressed by the $MO \cdot 6 \cdot Fe_2O_3$, where M represents an element such as Ba, Sr, Pb or their mixtures with or without bivalent metal such as Ca. Actually, however, the MO content is somewhat excessive so that the materials of such permanent magnets are expressed by $MO \cdot nFe_2O_3$, where n represents a value of 5 to 6.

Various cylindrical permanent magnets have been proposed and used hitherto, such as isotropic ferrite magnet, ring anisotropic ferrite magnet, and plastic magnets formed by dispersing ferrite magnetic powder in a matrix such as synthetic rubber, synthetic resin or natural rubber.

These known permanent magnets, however, suffer from various disadvantages as follows. Namely, the isotropic ferric magnet, which is usually produced by compacting, cannot provide satisfactory magnetic properties, since magnetic rubber is oriented in direction at random. The ring anisotropic magnet 11 as shown in FIG. 1 has a radial particle orientation as shown by arrows B. The magnetization after the sintering, however, is conducted by means of a magnetizing yoke A composed of a yoke member 1 formed of ferromagnetic material and coils 2 as shown in FIG. 2. Therefore, the direction of particle orientation and the direction of line of magnetic force indicated by arrows C locally discord with each other. Thus, the ring anisotropic magnet 11 cannot provide effective particle orientation. Such ring anisotropic ferrite magnet is described in U.S. Pat. Nos. 3,114,715 and 4,057,606. In the plastic permanent magnet 12 as shown in FIG. 3, the particle orientation coincides with the directions of lines of magnetic force indicated by arrow C. This plastic magnet 12, however, cannot provide sufficient amount of magnetic flux because of small residual magnetic flux density. Such plastic magnet is described in Japanese Laid-Open Patent Publication No. 57-130407.

In addition, the conventional cylindrical permanent magnet could not avert from the problem of large inertia force which is caused inevitably by increased wall thickness for obtaining a high magnetic properties.

SUMMARY OF THE INVENTION

Accordingly, an object of the invention is to provide a multipolar surface magnetized magnet having a high surface magnetic flux density.

Another object of the invention is to provide a permanent magnet which exhibits a high holding torque when used as the rotor magnet of a stepping motor.

To these ends, according to the invention, there is provided a sintered cylindrical permanent magnet having a magneto-plumbite type crystalline structure expressed by $MO \cdot nFe_2O_3$, where M represents Ba, Sr, 15 Pb or their mixture and n being a value of 5 to 6, the magnet being provided in its cylindrical surface with multipolar anisotropy.

The advantage of the invention is remarkable particularly when more than 8 (eight) poles are provided on the outer peripheral surface of the cylindrical body of the magnet.

The term "surface anisotropy" in this specification is used to mean a state in which magnetic poles of different polarities actually exist or are formable on the same surface of the permanent magnet such as cylindrical outer peripheral surface, and easy axes of magnetization of ferrite particles, which have magnetoplumbite crystalline structure having unidirectional magnetic anisotropy, are substantially aligned with the lines, normally arcuate lines, interconnecting the magnetic poles through the body of the magnet.

The invention aims also at providing a cylindrical permanent magnet in which the particle orientation for attaining effective amount of magnetic flux is achieved in advance to the sintering thereby to impart the surface multipolar anisotropy while attaining high magnetic properties and a reduced inertia force.

These and other objects, features and advantages of the invention will become clear from the following description of the preferred embodiments taken in conjunction with the accompanying drawings.

DESCRIPTION OF THE PREFERRED EMBODIMENT

Figure 4:
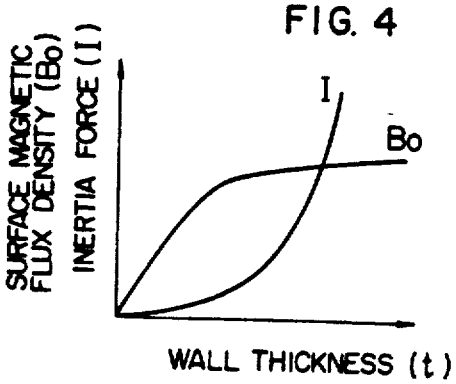
FIG. 4 shows surface magnetic flux density and inertia force in relation to the wall thickness as observed in a cylindrical permanent magnet.

Generally, the multipolar cylindrical magnet for use as the rotor of a motor is required to satisfy both of the demands for high magnetic properties and low inertia force. These two demands, however, are generally incompatible with each other. If the wall thickness (t) of the cylindrical permanent magnet is increased for attaining a high surface magnetic flux density Bo, the inertia force I is increased undesirably, as will be understood from FIG. 4. To the contrary, if the wall thickness (t) is reduced to satisfy the requirement for smaller inertia force, the surface magnetic flux density Bo is decreased unfavourably. Accordingly, it is necessary to optimize the size of the magnet so as to obtain sufficiently small inertia force without being accompanied by substantial reduction in the surface magnetic flux density Bo.

According to the invention, the inside and outside diameters of the cylindrical permanent magnet are selected to meet the following condition.

$$T = D_1/D_2 = 1 - K_1\pi/P \ (K_1 \leqq 1.5)$$

Where, $D_1$ represents the inside diameter of magnet, $D_2$ represents the outside diameter of permanent magnet, P represents the number of magnetic poles and $K_1$ represents a constant.

In the aforementioned formula, the inside to outside diameter ratio T ranges between 0 and 1.0. As the ratio gets closer to 1, the wall thickness (t) becomes smaller so that the surface magnetic flux density $B_O$ gets smaller. To the contrary, as the ratio T approaches 0 (zero), the wall thickness (t) gets larger to make the magnet resemble a pillar or solid cylinder, resulting in an increased inertia force I.

The right side of the aforementioned formula suggests that an increase in number of magnetic poles P causes an increase in the inside to outside diameter ratio T resulting in a reduced wall thickness (t). On the other hand, the wall thickness (t) is increased as the number P of magnetic poles is decreased. It is thus possible to obtain the optimum inside and outside diameters, i.e. the diameter ratio T, also on consideration of the number P of magnetic poles.

An explanation will be made hereinunder as to how the formula mentioned before is derived. As the outer peripheral surface of the cylindrical permanent magnet is magnetized to develop magnetic poles of a number P, the circumferential distance between adjacent magnetic poles, i.e. the distance along the outer peripheral surface of the cylindrical magnet between the centers of adjacent magnetic poles of different polarities, ties, is expressed by $\pi D_2/P$. The penetration depth of the magnetic flux is then expressed by $K_1\pi D_2/P$, where the constant $K_1$ is determined experimentally as explained later. Since the thickness of the wall portion not penetrated by the magnetic flux does not constitute an essential part of the cylindrical permanent magnet, the effective inside diameter $D_1$ of the magnet is expressed as follows.

$$D_1 = D_2 - K_1\pi D_2/P$$

The following formula is derived by diving both sides of the above formula by $D_2$.

$$D_1/D_2 = 1 - K_1\pi/P$$

The optimum ratio T between the inside diameter and the outside diameter of the cylindrical permanent magnet of the invention is determined by this formula.

Figure 5:
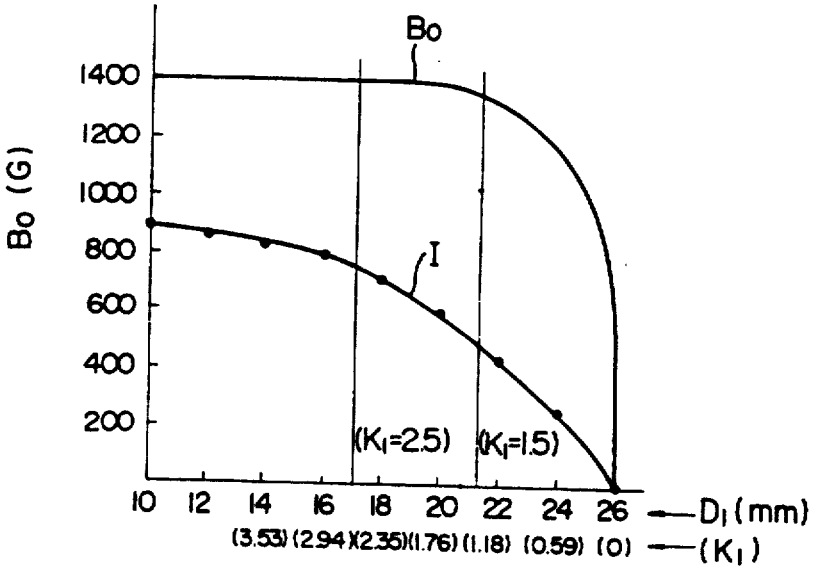
FIG. 5 shows the surface magnetic flux density and inertia moment in relation to a change in the inside diameter of the cylindrical permanent magnet.

An explanation will be made hereinunder as to an example of experimental determination of the constant value $K_1$, with specific reference to FIG. 5. Namely, FIG. 5 shows how the surface magnetic flux density $B_o$ and the inertia moment I are changed in accordance with changes in the inside diameter $D_1$ and the constant value $K_1$, in a cylindrical permanent magnet having an outside diameter $D_2$ of 26 mm and 24 (twenty four) magnetic poles in total. From this Figure, it will be seen that a specifically high surface magnetic density is obtained when the constant $K_1$ takes a value not smaller than 1.5. Considering that the smaller inertia force ensures higher performance of rotor magnet, the constant value $K_1$ is selected to meet the condition of $1.5 \leqq K_1 \leqq 2.5$.

The cylindrical permanent magnet of the invention is formed from a material containing, in addition to the major constituents mentioned before, a suitable amount of additives for imparting a self-supporting force, as well as 14 to 20% of water for permitting the rotation of particles when the material is placed under the influence of a magnetic field. Then, the formed body is placed under the influence of the magnetic field to orientate the particles in the direction of lines of magnetic force, and is then sintered to become the permanent magnet as the final product. The magnet, if desired, is machined to a final shape.

The water content is selected to range between 14 and 20% because any water content below 14% makes the compacted body too hard to permit smooth orientation of particles for attaining desired anisotropy, resulting in an imperfect magnetic properties, while a water content in excess of 20% seriously deteriorates the self-supporting force of the compacted body to make the forming materially impossible.

To apply pulse magnetic fields to the compacted body, the coil of the yoke may be connected to an instantaneous D.C. power supply, wherein an A.C. power source is used as an input and the A.C. current is rectified and raised to a predetermined D.C. voltage to charge a group of capacitors which effect discharge through thyristors.

With respect to the magnitude of the pulse magnetic field, a magnetic field of over about 10,000 Oersted is enough to accomplish this invention. Not only one but a combination of two pulse magnetic fields may be applied.

An experimental example of the invention will be described hereinunder.

(Experiment)

Figure 1:
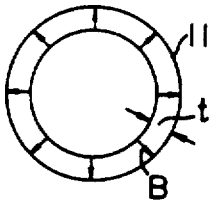
FIG. 1 shows the particle orientation in a conventional cylindrical permanent magnet.
Figure 2:
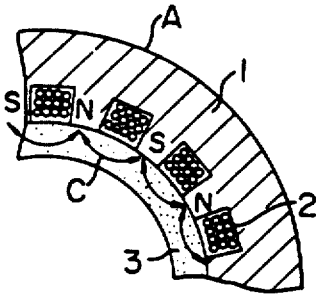
FIG. 2 is an enlarged view of a part of permanent magnet and magnetizing yoke.
Figure 3:
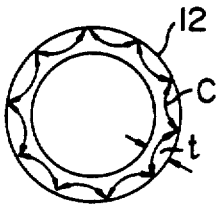
FIG. 3 is an illustration of the directions of lines of magnetic force in a permanent magnet.

A green body having an outside diameter, inside diameter and axial length of 33 mm, 23 mm and 30 mm, respectively, was formed by a compressing machine from a material consisting of powdered Sr ferrite ($SrO \cdot 5 \cdot 6Fe_2O_3$) containing 18% of water. The green body was inserted into a multipolar magnetizing yoke A as shown in FIG. 2 and was subjected to a magnetic field of more than 3,000 Oe. The green body was then, sintered at 1200° C. following 24 hour drying. The sintered body was machined to have an outside diameter, inside diameter and axial length of 26 mm, 18 mm and 20 mm, respectively. The body 3 was then magnetized by a multipolar magnetizing yoke having a shape similar to the magnetizing yoke A shown in FIG. 2, and the surface magnetic flux density $B_O$ was measured, the result of which is shown in Table 1 below together with the values obtained with a conventional isotropic magnet, ring anisotropic magnet and a plastic magnet by way of reference.

TABLE 1

| | Surface magnetic flux density B., (G) |
|---|---|
| isotropic magnet | 500 |
| ring anisotropic magnet | 1000 |
| plastic magnet | 1000 |
| magnet of invention | 1400 |

As will be understood from Table 1 above, the permanent magnet of the invention has attained about 40% increase in the surface magnetic flux density as compared with conventional magnets. The cylindrical permanent magnet of the invention used in this experiment had an outside diameter, inside diameter and axial length of 26 mm, 18 mm and 20 mm, respectively, and had 24 (twenty four) magnetic poles in total. In addition, the constant value $K_1$, is selected to range between 1.5 and 2.5 in view of the curve shown in FIG. 5, so that the size of the permanent magnet is optimized to provide a reduced inertia force without being accompanied by substantial reduction in the surface magnetic flux density.

Using the permanent magnets shown in Table 1 as the rotors of the stepping motor, an experiment was conducted by applying a DC voltage of 12 V to confirm the holding torques produced by these magnets, the result of which is shown in Table 2 below together with the magnetic properties of these permanent magnets.

TABLE 2

| | holding torque (g · cm) | magnetic properties Br (G) | Hc (Oe) |
|---|---|---|---|
| isotropic magnet | 660 | 2000 | 1700 |
| ring anisotropic magnet | 720 | 3200 | 2700 |
| plastic magnet | 700 | 3000 | 2500 |
| magnet of invention | 900 | 2600 | 3000 |

Since the magnetic properties were all measured in the radial direction, the magnet of the invention exhibits quite a low residual induction Br of 2600 Gauss. This magnet, however, exhibits quite a high holding torque.

As has been described, the cylindrical permanent magnet of the invention is provided with the surface multipolar anisotropy prior to the sintering so that the particles are oriented in the magnetizing direction. The sintered permanent magnet of the invention, therefore, has an extremely high surface magnetic flux density which in turn permits a high magnetic properties. In addition, since the size of the magnet is optimized in view of the formula mentioned before, the weight and, hence, the inertia force of the magnet is decreased advantageously as compared with conventional magnets, without being accompanied by any substantial decrease in the magnetic properties. The reduced weight permits also an economical use of the material.

Although a specific embodiment applied to a rotor magnet of stepping motor has been explained, the described embodiment is not exclusive and various changes and modifications are possible without departing from the scope of the invention. For instance, the cylindrical permanent magnet of the invention may have an increased axial length so that it may be used in a copying machine incorporating a magnetic brush development for latent images.

What is claimed is:

1. A cylindrical permanent magnet, comprising:

a sintered material having a composition expressed by $MO.nFe_2O_3$, where M represents Ba, Sr, Pb or a mixture thereof, and n is a value of 5 to 6, the magnet being characterized by a surface multipolar anisotropy of more than eight poles imparted to the cylindrical portion of the magnet, and the magnet being further characterized by having an inside diameter $D_1$ and an outside diameter $D_2$ of the cylindrical portion which satisfy the condition:

$$D_1/D_2 = 1 - K_1\pi/P$$

where P is the number of poles imparted to the cylindrical portion of the magnet, and $K_1$ is a constant defined by [1.5] $\propto 1.76 \leqq K_1 \leqq 2.5$.

2. A cylindrical permanent magnet according to claim 1 wherein $D_1/D_2 \leqq 0.65$.

3. A method of producing a cylindrical permanent magnet comprising the steps of forming a cylindrical green body from a material consisting essentially of $MO.nFe_2O_3$, where M represents Ba, Sr or Pb and n being a value of 5 to 6, and containing 14 to 20% of water, subjecting the green body to multi-polar magnetic fields to impart a surface multipolar anisotropy of more than 8 (eight) poles, and then sintering the body.

4. A method of producing a cylindrical permanent magnet according to claim 3, wherein the inside diameter $D_1$ and the outside diameter $D_2$ of the cylindrical portion of the sintered body are selected to meet the following condition:

$$D_1/D_2 = 1 - K_1\pi/P$$

where, $K_1$ representing a constant value not smaller than 1.5, said sintered body being magnetized at its surface to develop a multiplicity of magnetic poles.

5. A method of producing a cylindrical permanent magnet according to claim 4, wherein said constant value $K_1$ is selected to meet the condition of $1.5 \leqq K_1 \leqq 2.5$.

* * * * *

UNITED STATES PATENT AND TRADEMARK OFFICE

CERTIFICATE OF CORRECTION

PATENT NO. : RE 34,229
DATED : April 20, 1993
INVENTOR(S) : MOTOHARU SHIMIZU et al.

It is certified that error appears in the above-identified patent and that said Letters Patent is hereby corrected as shown below:

Claim 1, column 6, lines 24, delete "$\alpha$ ".

Claim 2, column 6, lines 26, "$\leqq$" should read --$\geqq$--.

Claim 3, column 6, line 30, "$MO.nFe_2O_3$" should read --$MO \cdot nFe_2O_3$--.

Claim 4, column 6, line 41, "$D_1/D2$" should read --$D_1/D_2$--.

Signed and Sealed this

Fourteenth Day of December, 1993

*Attest:*

*Attesting Officer*

BRUCE LEHMAN

*Commissioner of Patents and Trademarks*